Figure 1:
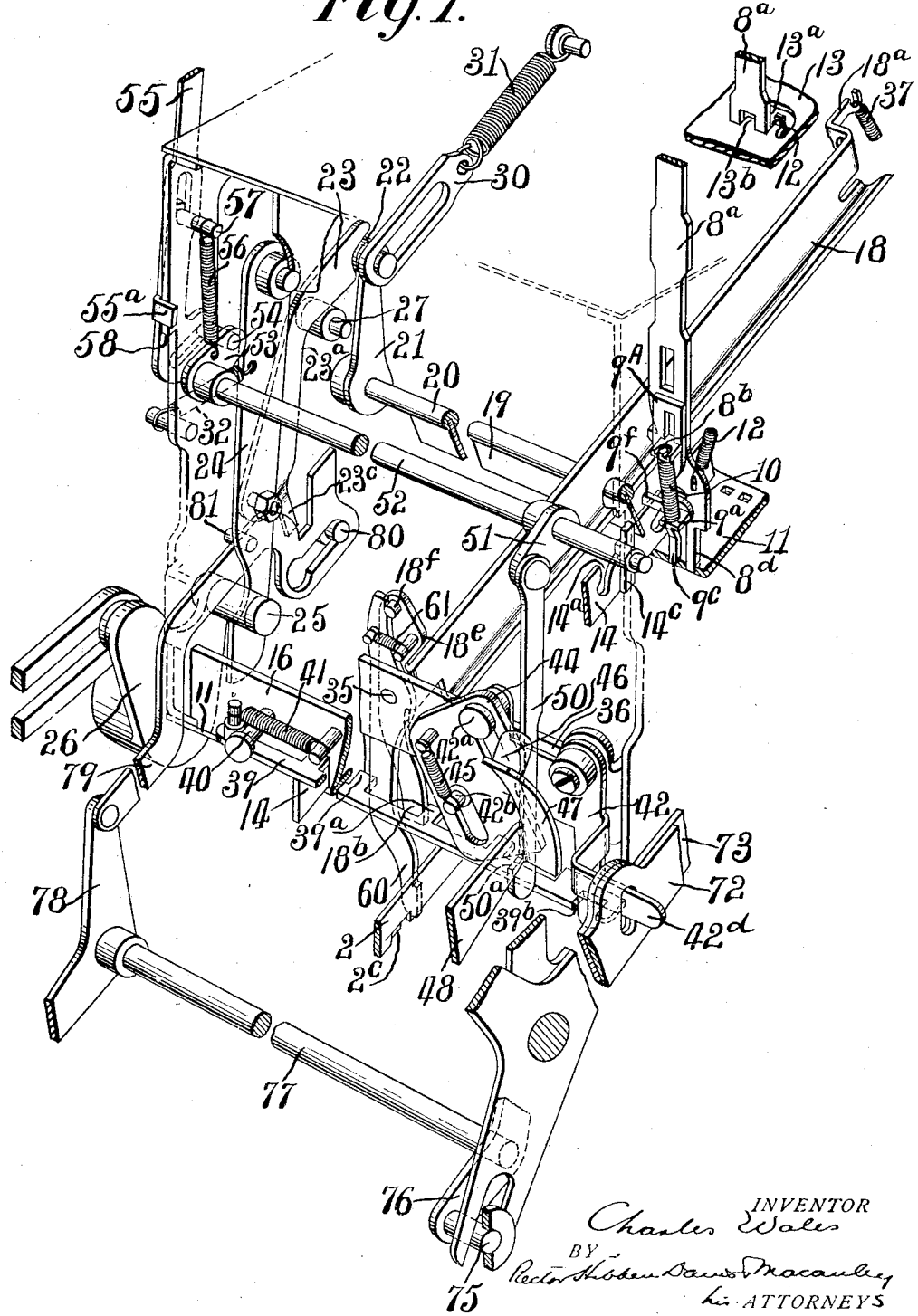

Dec. 7, 1926.

C. WALES 1,609,335

ADDING MACHINE

Filed Oct. 11, 1923  4 Sheets-Sheet 1

INVENTOR
Charles Wales
BY
his ATTORNEYS

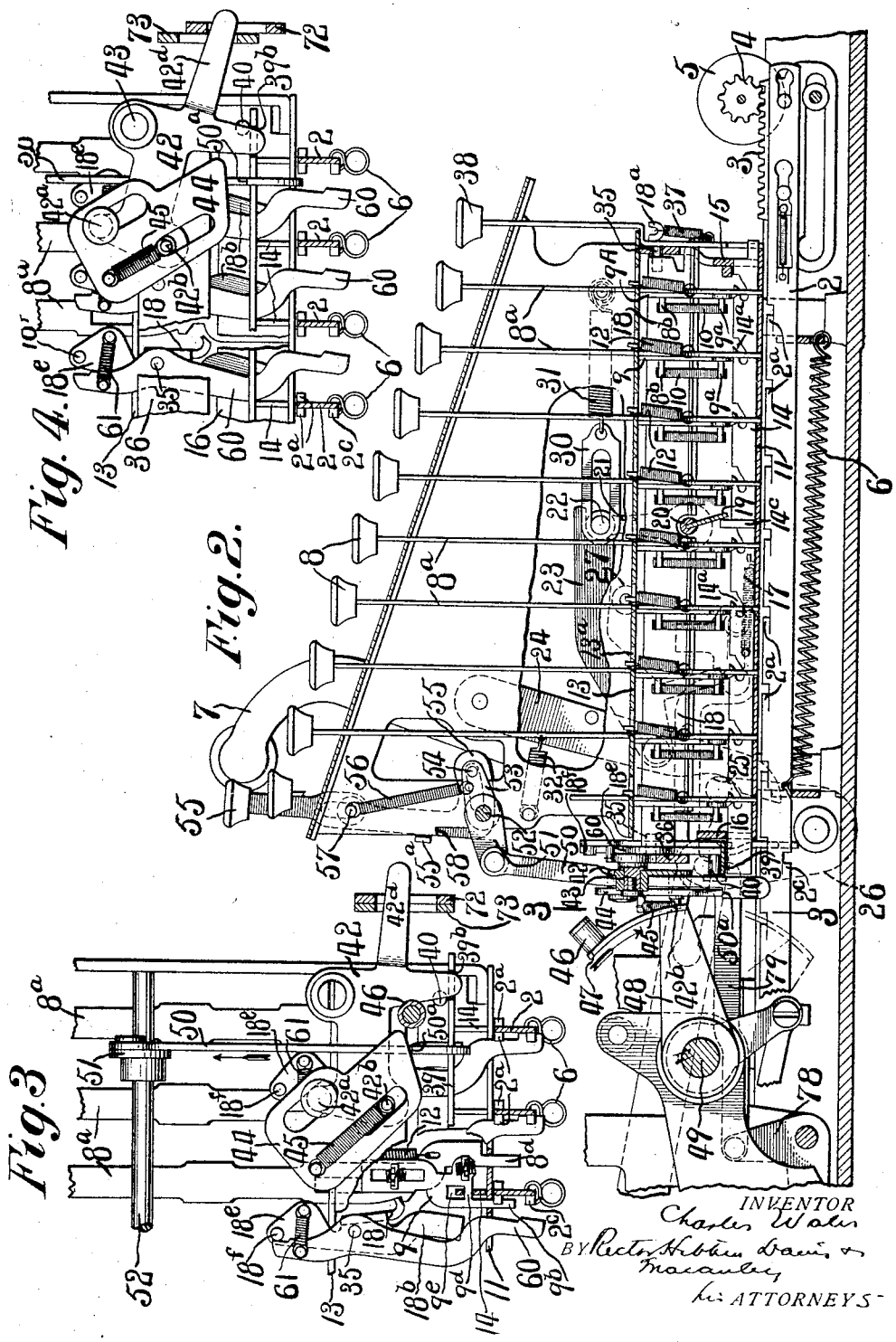

Dec. 7, 1926.

C. WALES

ADDING MACHINE

Filed Oct. 11, 1923 4 Sheets-Sheet 3

1,609,335

INVENTOR
Charles Wales
BY
ATTORNEYS

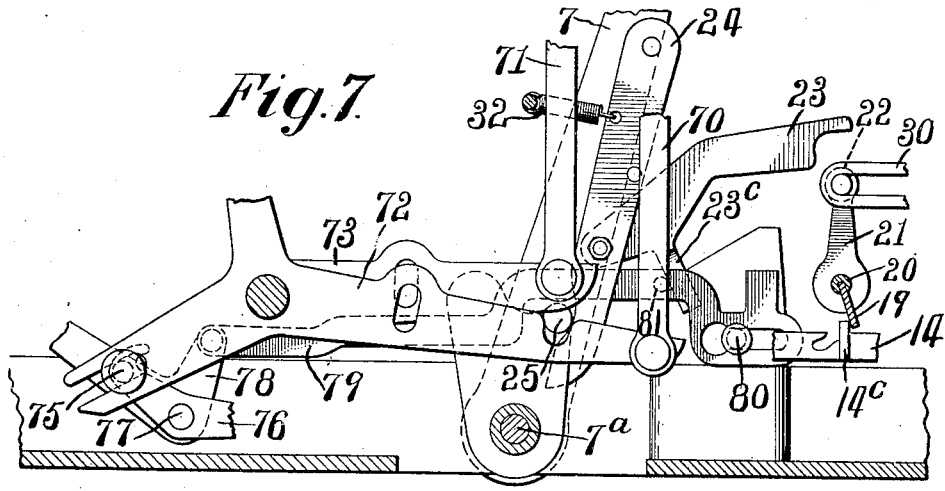
Fig. 7.
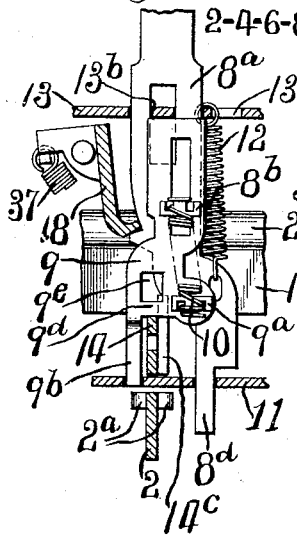
Fig. 8.
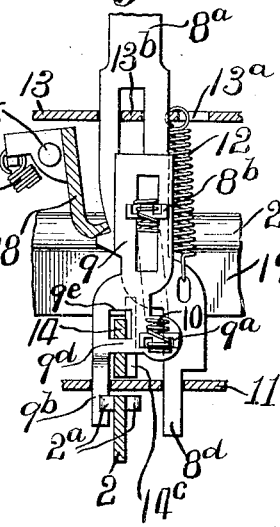
Fig. 9.
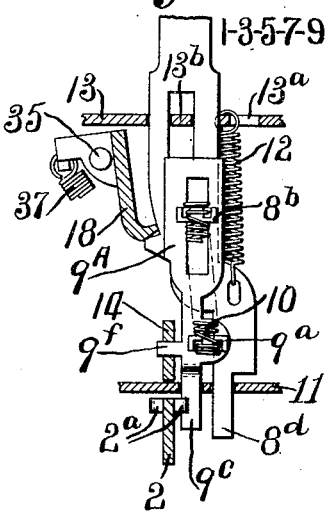
Fig. 10.
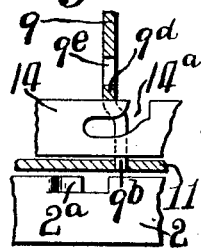
Fig. 8ᴬ
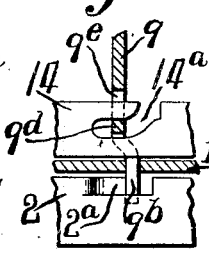
Fig. 9ᴬ
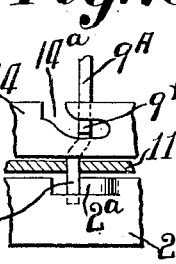
Fig. 10ᴬ
INVENTOR
Charles Wales
BY
ATTORNEYS Patented Dec. 7, 1926.

1,609,335

UNITED STATES PATENT OFFICE.

CHARLES WALES, OF NEW HAVEN, CONNECTICUT, ASSIGNOR TO BURROUGHS ADDING MACHINE COMPANY, OF DETROIT, MICHIGAN, A CORPORATION OF MICHIGAN.

ADDING MACHINE.

Application filed October 11, 1923. Serial No. 667,784.

One object of the invention is to provide an improved character of mechanism endowing an adding machine with the so-called "early key release" function. This means release of keys appreciably prior to completion of a cycle of the machine's operation so that manipulation of keys for the setting up of the next amount need not await such completion, and the expert operator can carry on his work up to the limit of physical possibility of speed in manipulating,—as for example when listing and adding bank checks, without the necessity of driving the machine at such speed as to shorten its life or invite inaccuracy in the performance of its functions. I have found that a machine equipped with my invention and slowed down to eighty or ninety operations per minute will enable the speediest operator to do capacity work which, in the case of a similar machine minus early key release equipment, would require speeding up to 130 operations per minute of such machine in order to keep pace with speed of manipulation of which such an operator is capable.

In a machine equipped with my invention depression of amount keys is not accompanied by interposition of indexing stops into the paths of the actuators which set the type and turn the accumulator wheels. Depression of keys simply stores power in stop setting springs and then at the outset of an operation of the machine such power is released and the stops become locked in set position so that thereupon the keys themselves may be released and further key-depression may then be practiced with the effect of storing power for the proper setting of stops at the outset of the next ensuing operation of the machine. Keys may thus be released and re-manipulated at a very early stage in the operation of the machine,—early enough to anticipate the utmost dexterity of the speediest of operators.

Another object of my invention is to ensure correctness of totals by making it impossible for error to result from the holding down of one or more amount keys while a totaling operation is going on. With an equipment such as just above indicated this is accomplished by having the total and sub-total keys of the machine, when either is depressed, act to disable the means for releasing power stored by amount-key depression so that there can be no setting of a stop in the path of an actuator and the actuators will be controlled in their type-setting movements solely by the zeroizing of the accumulator wheels.

Figure 5:
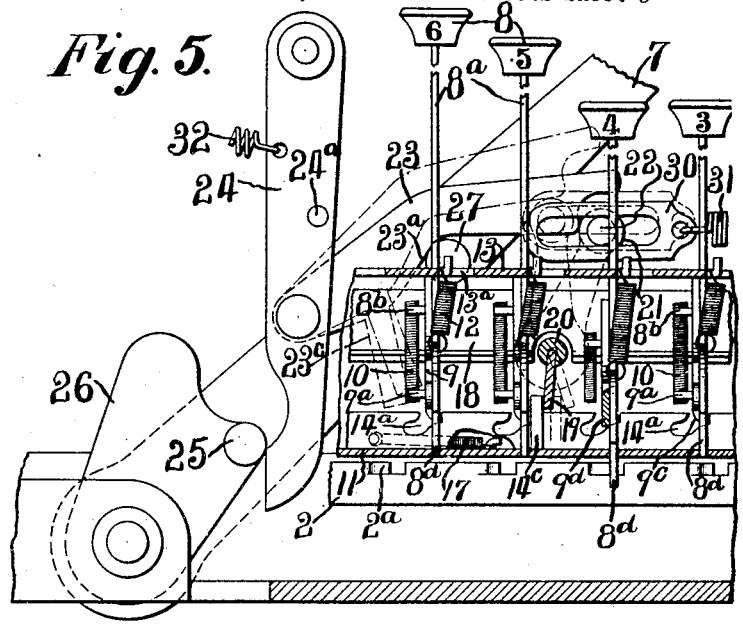
Figure 6:
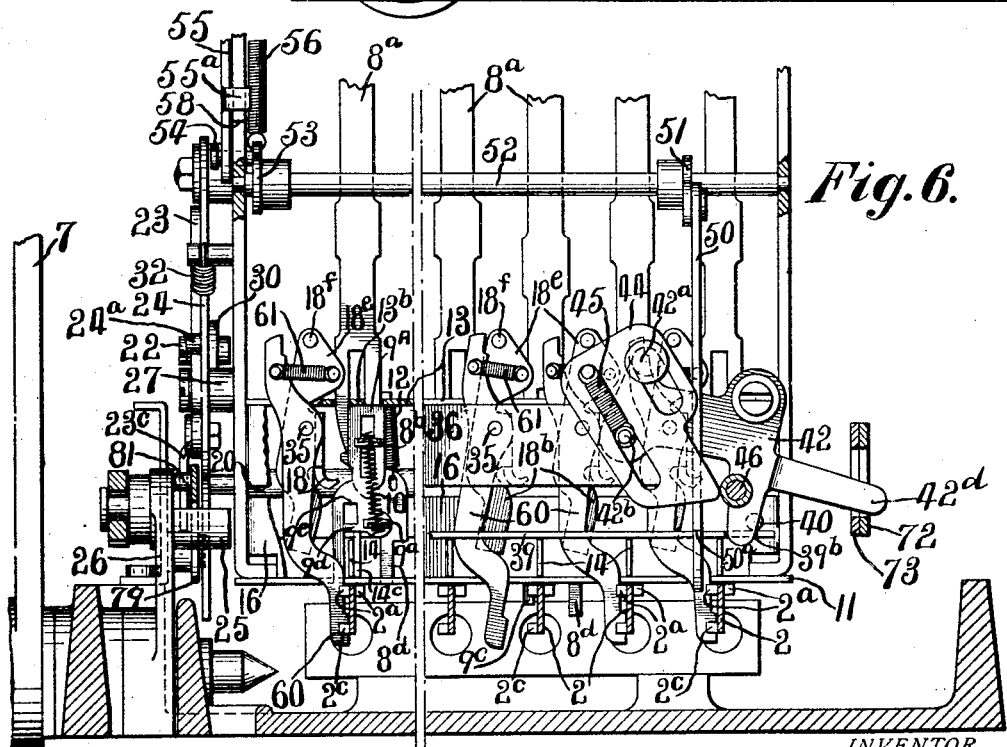

Referring to the drawings which accompany and form part of this specification, Fig. 1 represents a skeletonized perspective view looking from the rear of the machine, various parts being broken away and shown in fragmentary fashion, all with the object of graphically portraying in a single view the various mechanical elements employed in this particular embodiment of my invention and their relation to certain of the standard parts of the machine; Fig. 2 represents a vertical longitudinal section of that portion of the machine wherein the invention is embodied, the section being taken toward the left-hand side of the machine and all of the parts being represented as at normal; Fig. 3 is a sectional rear elevation confined to a left-hand portion of the machine taken substantially on the line 3—3 of Fig. 2 and illustrating a condition brought about by the setting down of a special key commonly referred to as a "Repeat" key, the condition here illustrated being that which would obtain when the operating handle of the machine has been given its initial or forward stroke; Fig. 4 is a similar view illustrating the effect of depressing another special key, to-wit, the "Total" key; Fig. 5 is a fragmentary vertical longitudinal section on the order of Fig. 2 but taken at a point over toward the right-hand side of the machine and illustrating the condition when the operating handle has been drawn about half way forward; Fig. 6 is another rear elevation on the order of Figs. 3 and 4, but taking in more of the machine, and illustrating a condition that obtains at about the same stage of operation as that illustrated in Fig. 5 but somewhat further advanced; Fig. 7 is a sectionalized side elevation—somewhat further rearward than either Fig. 2 or Fig. 5 and corresponding with Fig. 4 in showing a condition brought about by depression of the total key; Figs. 8, 9 and 10 are enlarged cross-sections of individual numeral key constructions,— Fig. 8 illustrating the effect of depressing a key, and Figs. 9 and 10 illustrating the further effect of starting the operation of the machine while the key is depressed, differing forms of key stop pieces being shown; Figs. 8^A, 9^A and 10^A are fragmentary sectional views at right angles to Figs. 8, 9 and 10 and further illustrating the conditions referred to in describing the latter figures.

In the type of adding machine here illustrated registering and typesetting are done by horizontal slide-bars 2 which carry racks 3 at their forward ends in mesh with pinions 4 on the numeral wheels 5, and at their rear ends are pivotally connected with type-carrying levers (not shown). Springs 6 are applied to these slide-bars for driving them forward and a swinging frame or bail (not shown) normally holds them rearward through engagement with the type-carrying levers. The arrangement in this regard is so well-known to those skilled in the art as to require no illustration or detailed description. Suffice it to refer to the well-known effect of drawing forward the operating handle 7, to-wit, the effect of permitting the said bail to swing forward so that the slide-bars may advance until checked by stops that have been set through depression of numeral keys 8 or by zero stops in those orders where no keys have been used. See e. g. Pentecost Patent 1,049,527, issued January 7, 1913. Ordinarily the key-stems themselves constitute stops against which the lateral projections on the slide bars strike, but in carrying out the present invention that function is not performed by the key-stems themselves. The slide-bars are made in the usual way with tangs 2^a struck out alternately on opposite sides to constitute the lateral projections, but these, instead of coacting directly with the key-stems, coact with special stop-pieces so related to the key-stems, and to other parts presently to be specified, that depression of a key simply makes ready for the interposition of the associated stop-piece and the first part of the forward stroke of the operating handle causes such stop-piece to be put into the path of the corresponding tang of the slide-bar. The key-stem itself is then released as the forward stroke of the operating handle continues.

Owing to the fact that the slide bar tangs project alternately right and left there is a slight difference in construction as between the stop pieces associated with the 1, 3, 5, 7 and 9 keys and those associated with the 2, 4, 6 and 8 keys, but they all function in exactly the same way and their manner of assembly with the key-stems is the same. In each instance the stop piece is in the form of a flat plate placed against the rear side of the key-stem 8^a and vertically slidable thereon and connected thereto by a "push-and-pull" spring, so that the effect of pushing down the key-stem is to put pressure upon the stop piece. Referring to Fig. 8 which illustrates the stop piece appropriate to the 2, 4, 6 and 8 keys, 9 designates the plate which is vertically slotted to receive a T-form stud 8^b on the key stem, and 10 designates the push-and-pull spring, a coil at the upper end of which embraces a headed teat in a recess of said stud and a coil at the lower end of which similarly embraces the headed teat of a stud 9^a on the stop plate. The latter has a depending flat finger 9^b to coact with the tang 2^a of the slide-bar 2. It is guided in a slot of the lowermost keyboard plate 11 and is normally above the horizontal plane of said tang and is offset into the transverse vertical plane of the key stem so as to have the same fore-and-aft relationship to the tang that said key stem would have in the ordinary construction where the latter itself constitutes the stop for measuring the movement of the slide-bar. In the present construction the lower end of the key stem is offset laterally so that its depending finger 8^d which is guided in a slot of said keyboard plate 11 will be spaced away from the slide-bar. A spring 12 normally upholds the key, being hooked at its lower end in an eye of the offset part of the key stem and at its upper end to a tang of the intermediate keyboard plate 13. The key stem passes through a relatively large opening 13^a in said plate, from one side of which opening projects the said tang and also a lug 13^b occupying a vertical slot in the keystem for guiding purposes. See Fig. 1.

In the foregoing respects the 1, 3, 5, 7, 9 key construction and arrangement is identical excepting that, instead of being laterally offset like the depending finger 9^b of stop piece 9, the depending finger 9^c of the stop-piece 9^A extends straight down so as to coact with a tang of the slide bar at the opposite side thereof. Then there is a further difference in form between the stop pieces, which has to do with their delayed release and their being locked down, and which will presently be explained.

Depression of a key is not accompanied by descent of its stop piece, which does not occur until the operating handle starts on its initial or forward stroke. A lock strip 14 is set on edge above the lower keyboard plate 11 and extends alongside all of the stop-pieces of the series and beneath shoulders thereof, whereby their descent is obstructed. In the case of the form of stop-piece used with the 2, 4, 6 and 8 key the shoulder is the lower edge of a short cross-bar 9^d at the lower side of an opening 9^e, whereas in the form of stop-piece for the 1, 3, 5, 7, and 9 keys the shoulder is the lower edge of a laterally projecting finger 9^f. The lock-strip is confined in vertical slots of front and rear transverse frame plates 15 and 16 and is slidable to a limited extent for the purpose of freeing any stop-piece whose key has been depressed and for locking it in its lowered and effective position. To this end the lock strip is formed in its upper edge with a series of spaced and undercut notches 14ᵃ. Normally and as illustrated in Fig. 2, the lock strip is held forward by a spring 17 connecting its rear end with the plate 11, so that portions of its upper edge just back of the mouths of the notches will stand below the aforesaid shoulders of the stop pieces to obstruct the descent thereof.

Upon depressing a key as illustrated in Fig. 8, the shoulder of the stop piece will be pressed down upon the top edge of the lock-strip (Fig. 8ᴬ) and the push-and-pull spring 10 will be compressed. This condition will be preserved when finger pressure is removed from the key, by reason of the engagement of a detent wing 18 with a notch of the key stem as commonly practiced in this type of adding machine and as illustrated in Fig. 8.

As the operator starts the operating handle forward the lock-strip (through means presently to be specified) is given a short reciprocation, first rearward (Fig. 5) whereby the mouths of the notches are brought directly below the shoulders of the stop-pieces. Thereupon that one of the latter which is associated with a depressed key (as the 4 key, Fig. 5) will be thrust downward by its spring 10, so that its finger 9ᵇ will enter the path of the slide bar tang 2ᵃ. Upon the return (forward) movement of the lock strip, which immediately ensues, the under-cut portion of the notch will engage the short cross bar 9ᵈ or the lateral finger 9ᶠ, as the case may be, and lock down the stop piece as shown in Figs. 9, 9ᴬ 10 and 10ᴬ; all the other stop pieces of the series being locked out by return of notch noses beneath them. Such condition having been established, the key itself can be released and restored to normal by its own spring 12 which, being superior in strength to the spring 10, will stretch the latter while the stop piece remains locked down. Hence release and restoration of depressed keys can be practiced at a very early stage in the operation of the machine, even prior to the termination of the forward stroke of the operating handle, or of the corresponding power-driven element of a motor-equipped machine. Keys can then be depressed for the setting up of a new amount while the machine is performing its work of recording and registering the previously set up amount. Stop-pieces that were locked down for the indexing of that previously set up amount remain so when the operation has been concluded and until another operation of the machine is started and the lock strips are moved rearwardly as before described so that the stop pieces can escape from the notches of said strips. Since the springs 10 of such stop pieces had been stretched by the superior key springs 12 when the latter restored the keys to normal said springs 10 will pull up these stop pieces. Of course if the same key happens to have been again depressed the associated spring 10 would have been again contracted so that instead of pulling up on the associated stop piece it would hold the latter down in the notch, and this same stop piece would simply again become locked down.

It will be observed that the notches of the lock strip are of such formation as to provide for a camming action between them and the cross bars and lateral fingers of the stop pieces. Thus upon rearward thrust of the lock strip the forward portions of the bottom edges of the notches will act upon the shoulders of the stop pieces to assist in raising the latter out of the notches, and in the return (forward) movement of the lock strip the rounded upper rear edges of the notches may act upon the stop edges of cross bars and lateral fingers of depressed stop pieces to aid in forcing them into the notches.

In the specific embodiment of my invention here illustrated setting and locking down of stop pieces occurs by the time the operating handle has executed about half of its forward or initial stroke and the release of the keys occurs by the time the handle has further advanced through three-quarters of its total forward stroke, so that before that stroke is ended the keyboard is ready for the setting up of a new amount. The timing in this regard may of course be varied. In a hand-operated machine it would suffice to have the keys released at the very end of the forward stroke of the handle because ordinarily the operator fingers the keys with the same hand that he uses in pulling the operating handle forward. In a power-driven machine, however, he has merely to touch a button or bar and so is free to re-manipulate the keyboard at an earlier stage in the operation of the machine. It will be seen that the principle of my invention is such as to enable the operator to re-manipulate the keyboard at the earliest moment it would be physically possible for him to do so, even in a power driven machine.

Referring next to the means for causing reciprocation of the lock strips, (Figs. 1, 2, and 5) each of them has an up-standing lug 14ᵉ and there extends across in front of these lugs a blade 19 which is set in a rock shaft 20 journaled in the side frame pieces. A crank arm 21 is secured to the rock shaft and has a roller stud 22 which is operated upon by pawl 23 for the purpose of driving the blade 19 against the lugs 14ᵉ and thereby forcing the lock strips rearward in opposition to their springs 17. The said pawl is pivoted to a lever 24 pivoted to the frame of the machine and standing in the path of a roller stud 25 on a crank piece 26 secured to the operating handle shaft. The pawl 23 is of angular form and its forward under edge rests upon a roller 27 mounted on the stationary frame-work of the machine. When the operating handle is drawn forward the roller stud 25 acts upon the lever 24, swinging it forward and with it the pawl 23; so that the shouldered end of the latter acts against roller stud 22, rocking the crank arm 21 and rock shaft 20 and forcing the blade 19 against the lugs of the lock strips. When the rearward inclined under edge 23ª of the pawl reaches the stationary stud 27 and rides upon the same the pawl is thrown upward out of engagement with the roller stud 22, (dotted lines Fig. 5) whereupon the lock strip springs assert themselves and drive the lock strips forward, swinging the blade 19 back to its normal position. In order to properly limit the back-throw of the blade and its crank arm and also to cushion the blow and absorb shock, I apply a slotted link 30 to the stud 22 and connect the link by a spring 31 to a stud on the frame of the machine. The spring and link also serve as means for limiting the forward movement of the lock strips and properly establishing their normal positions with the lugs 14ᶜ in alignment.

Fig. 5 shows the handle drawn about half way forward and the pawl about to disengage from the roller stud of the crank arm, and the dotted lines illustrate the next step when the pawl has fully disengaged from said stud and the crank arm and blade have been thrown back to normal position. A spring 32 connects the lever 24 with a stud on the rear portion of the machine frame for the purpose of restoring the lever and the pawl when the operating handle executes its rearward stroke, this action being accompanied by lowering and retraction of the pawl and its re-engagement by gravity with the crank arm stud.

In machines of this type the rack-carrying slide bars are not freed from the restraint of the restoring bail immediately upon the operating handle being started forward, for certain preliminary functioning must take place, such as disengagement of the adding pinions from the rack; and the timing in this regard and also the control maintained over the restoring bail in its forward swing when being followed up by type-carrying levers to which the slide bars are connected, amply provide for the release and descent and locking down of the stop pieces well ahead of arrival of slide bars at positions where any of their stop tangs should encounter the stop pieces for properly measuring excursions of the slide bars in conformity with the value of the depressed keys.

Referring next to latching down and release of the keys, each of the wings 18 has laterally turned end portions pivotally engaged with pintles 35 on front and rear frame cross bars 15 and 36, and a spring 37 is applied to a forwardly projecting arm 18ª of the wing to press the same against the edges of the key stems. These springs are conveniently connected with the ordinary column-key release keys 38 so as to also subserve the function of holding up those special keys. At its rear end, as best seen in Fig. 1, the detent wing has its laterally turned portion extended downwardly in the form of an elongated arm 18ᵇ which extends past the front edge of a horizontal slide bar 39 and adjacent a forwardly projecting lug 39ª thereof. There is one of these lugs for each of the detent wings so that a shift of the slide bar to the left as the parts are seen in Fig. 1 will result in swinging all of the detent wings away from their respective rows of key stems, thereby releasing any depressed keys. The slide bar rests upon the top edges of the lock strips 14 and is held down by studs 40 projecting from the frame cross piece 16. A spring 41 connects an upstanding stud on the slide bar with a stud on said frame cross piece so as to normally hold the slide bar to the right as the parts are seen in Fig. 1.

A plate-form bell-crank lever 42 is pivoted upon a stud 43 carried by the frame crosspiece 36. The depending branch of said bell crank lever engages a notch 39ᵇ in the slide bar for the purpose of shifting the latter in opposition to its spring. Against the laterally extending and wide arm of the bell crank lever 42 there is mounted a plate 44 which is set at an angle of about 45 degrees and is slotted to receive studs 42ª and 42ᵇ carried by the bell crank lever, the stud 42ª being headed for holding the plate against the lever and the stud 42ᵇ being connected by a spring 45 with an upper stud on the plate. Said spring holds the plate in lowered position with a corner portion or nose thereof in the path of a roller 46 carried by a regularly reciprocating member of the operating mechanism of the machine. In the present instance this roller is carried by an upward curved extension 47 of an arm 48 which is fastened to the familiar oscillating drive shaft 49 (Fig. 2). Said shaft is operatively connected in a familiar manner with the handle shaft so that during the forward stroke of the handle this shaft 49 is turned in a clockwise direction as the parts are seen in Fig. 2, which will carry the roller 46 down against the inclined side edge of the plate 44 and so swing it together with the bell crank lever 42 in a clockwise direction as the parts are seen in Fig. 1, and thereby bring about release of depressed amount keys at the proper time in the operation of the machine. The timing of the release may be determined by the length of the arm 47 or the particular location of the roller thereon and, of course, these parts can be made adjustable so as to provide for varying the time of key release. The down-stroke of the roller 46 is sufficient to take it past the corner of the plate 44 and permit the bell crank lever 42 to be restored to normal position and when the said roller makes its return (upward) stroke it strikes against the under edge of the plate 44 and lifts the latter, stretching the spring 45, and then wipes past the corner of the plate, permitting it to return to its normal position,—all without transmission of any movement to the bell-crank lever 42.

It will be understod from the foregoing that the automatic key release, i. e., release accompanying operation of the machine, takes place during the forward or initial stroke of the operating handle, being timed to occur as before mentioned, to-wit, following upon the setting and locking down of the stop pieces.

It is customary in adding machines to facilitate operations that call for repeatedly registering the same amounts, by providing a special "Repeat" key whose depression will have the effect of disabling the key release mechanism. The mechanism just above described lends itself to ready realization of such a result. Thus upward displacement of the plate 44 will take its corner portion or nose out of the path of the roller 46. To accomplish such displacement at will a link 50 is suspended from the crank arm 51 of a rock shaft 52 and passes down between said plate 44 and the bell crank lever 42 and has a shoulder 50ª (Figs. 1 and 2) underlying the lower edge of the plate. The rock shaft 52 has another crank arm 53 at its opposite end with a stud 54 which engages a slot in the foot of the stem 55 of a repeat key. A spring 56 connects the crank arm 53 with a frame 57, (Fig. 1) so as to hold said key up and the link 50 down.

It will be seen that depression of the key 55 will rock the shaft 52 and lift the said link and effect the upward displacement of the plate 44, which will make the stroke of the roller 46 an idle one. The repeat key is conveniently located at the upper right-hand corner of the keyboard, its stem lying against the side frame upright and being slotted to engage an extension of the stud 57 on which it turns for locking purposes. Thus a lateral lip 55ª of the stem is adapted to engage under a shoulder 58 on the said frame upright and the slot in the foot of the stem provides for the swinging movement thereof without disturbing its operative connection with the rock shaft 52. Fig. 3 illustrates the condition when the repeat key has been depressed, the roller 46 being there illustrated as idly passing the cam-nose of the plate 44 which has been retracted by the link 50, so that the latched down key stem 8ª at the left of that figure of the drawings remains latched down and its stop-piece 9 remains in effective position.

In the case of orders where no amount keys are used it is of course necessary to restrain the rack-carrying slide bars by means other than the stop pieces of the keys and it has heretofore been customary to employ what are called zero stops which, in the particular type of machine here illustrated, have taken the form of pendant fingers integral with the detent wings and standing normally in the paths of rear tangs 2ᶜ of the slide bars. Such an arrangement provides for displacement of one of these zero stops whenever a key is depressed and rocks its detent wing, and the character of engagement between the wing and the key stem is such as to provide for the zero stop remaining displaced when the detent has engaged in the notch of the stem. Now since the automatic release of depressed keys involves rocking of all detent wings it will be obvious that where such release action takes place at an early stage in the operation of the machine some provision should be made to prevent release of a slide bar in any order where no key has been depressed. It will be seen that the common zero stop arrangement above referred to would scarcely do because displacement of zero stops would occur in the rocking of the detent wings by the release mechanism while the operating handle was executing its forward stroke, with the result that a slide bar in an order where no key had been depressed would be released from the restraint of its zero stop and would move forward so that an erroneous registration would result as likewise erroneous recording.

To overcome any such difficulty as above mentioned I have provided special zero stopping devices which may remain in effective position notwithstanding rocking of the detent wing, while at the same time the zero stops will be withdrawn upon the rocking of the detent wing by key depression. As shown more clearly in Figs. 1 and 6, there is pivoted upon the rear detent wing pintle 35 a zero stop member 60 whose lower extremity stands in front of the zero tang 2ᶜ just as does the ordinary zero stop finger in the regular machine. Above its pivot this zero stop member is connected by a spring 61 with a stud on an upper extension 18ᵉ of the laterally turned end portion of the detent wing 18 which also carries a limit stud 18ᶠ for the zero stop member to abut. Normally the zero stop member is held up against said limit stud as illustrated in Fig. 1, and when the detent wing 18 is rocked on key depression the said member moves as one with the wing, so that its lower end will be moved out of the path of the zero tang 2ᶜ. The movement of the zero stop member is limited by the adjacent lug 39ᵃ of the horizontal slide bar 39 and the wing moves slightly further as the key stem notch lug passes by it, the spring 61 stretching. However, this slight relative movement between the parts is not the important consideration, which is that the zero stop member may remain in effective position with the zero stop tang bearing against it, while the associated detent wing is swung through its full movement for releasing a depressed key. A condition is illustrated in Fig. 6 where a key has been depressed in only one of the illustrated orders, to-wit, that order third from the right. The roller stud 46 is just about to pass the nose of the plate 44 so that the key release action has occurred, all of the detent wings having been swung to the left as the parts are seen in this figure. Nevertheless only the zero stop member of the order where a key was depressed has been displaced. The explanation is that when the operating handle started forward and the several rack-carrying slide bars were released those of them in orders where no key had been depressed only advanced to the zero position, their rearmost tangs 2ᶜ striking against the associated zero stop members, and this condition existed at the time when the detent wings were swung to the left. Now the force of the springs applied to the rack-carrying slide bars is such that the friction between the tangs 2ᶜ and the rear faces of the lower ends of the zero stop members is amply sufficient to resist the relatively light pull of the springs 61 which connect the upper ends of the said members with the detent wings. Consequently the effect in all those orders where no amount key has been depressed is that illustrated in Fig. 6 wherein the said springs are shown stretched in all orders where the zero tangs 2ᶜ are engaged with the zero stop members. Of course upon completion of the operation and restoration of the rack-carrying slide bars to their normal rearward position the friction is relieved and the parts are so conditioned that upon depression of any amount key the zero stop member will be free to swing clear of the zero tang.

In the taking of a total or a sub-total as commonly practiced in these machines, it is of course necessary that the zero stop members be displaced so as to leave the rack-carrying slide bars free to advance. The stems of the total and sub-total keys are designated 70 and 71 in Fig. 7 and the levers which they commonly operate are designated respectively 72 and 73. These levers are slotted for the reception of a lateral finger 42ᵈ of the bell crank lever 42, so that upon depression of either the total or the sub-total key said bell crank lever will be rocked and all of the zero stop members will be displaced as illustrated in Fig. 4. The slight separation of the upper ends of these members from the limit studs on the detent wings is of no significance; it is merely due to the fact that the zero stop members encountered the lock strips 14. The accompanying displacement of the detent wings and their remaining displaced as long as the total key is down are desirable effects since no amount key ought to be latched down during a totaling operation.

In order to further guard against the possibility of error in a totaling operation I make special provision to prevent any stop piece being in effective position so long as the total or sub-total key is down. This ensures against error even though an amount key should be unintentionally or with malicious intent held down during the totaling operation. The rear extension of the total key lever 72 (which is operated when the sub-total key is depressed as well as when the total key is depressed) is forked as usual to engage a stud 75 on a crank arm 76 secured to a transverse rock shaft 77 on the opposite end of which is fastened a bell crank lever 78. I pivotally connect to the latter a link 79 slotted at its forward end to engage a frame stud 80 for guiding purposes, and carrying at an intermediate point a laterally projecting stud 81 to coact with a depending finger 23ᶜ of the pawl 23. It will be recalled that the latter is the instrumentality through which the lock strips are reciprocated to release stop pieces associated with depressed keys and to lock the same down in their effective positions. Manifestly if the pawl is disabled no such action can take place. Now through the connections just described the pawl is thrown up to a position where it cannot act upon the roller stud 22 and consequently cannot bring about the release of the key stop pieces. In Fig. 7 the total key is shown as down and the link 79 thrust forward so that its stud 81 is holding up the pawl 23. It follows that if a key is depressed and held down while the total or sub-total key is held down, and the operating handle is pulled, no interference with the totaling operation will result because the stop piece associated with the depressed key cannot move into effective position and so the totaling movement of the rack-carrying slide bar will not be obstructed.

I claim:

1. In a machine of the class described the combination with operating means, column actuators, and keys; of stops for measuring movement of the actuators, means for applying pressure to the stops by depression of the keys, means for releasing such pressure on setting in motion the operating means and thereby causing a stop to take up effective position, and means for thereupon restoring to normal the associated key while the stop remains in that position.

2. In a machine of the class described, the combination with operating means, column actuators, spring-upheld keys, and detent means therefor; of actuator stops on the keys spring-connected therewith, a lock strip below the stops having undercut notches, means for reciprocating said strip upon setting in motion the operating means whereby the stop of a depressed key is caused to spring into a notch of the strip and become locked down, and means for thereupon tripping the key-detent means to release the depressed key while the stop remains so locked and provide for immediate setting of another key.

3. In a machine of the class described, the combination with operating means, column actuators, spring-upheld keys, and detent means therefor; of actuator stops on the keys spring-connected therewith, a spring-held lock strip below the stops having undercut notches, means for moving said strip in opposition to its spring and then releasing it upon setting in motion the operating means, whereby the stop of a depressed key is caused to spring into a notch of the strip and become locked down, and means for thereupon tripping the key-detent means to release the depressed key while the stop remains so locked and provide for immediate setting of another key.

4. In a machine of the class described, the combination with operating means, column actuators, spring-upheld keys, and detent means therefor; of actuator stops, push-and-pull springs connecting said stops and said keys, a lock strip below the stops having undercut notches, means for reciprocating said strip upon setting in motion the operating means whereby the stop of a depressed key is caused to spring into a notch of the strip and become locked down, and means for thereupon tripping the key-detent means to release the depressed key while the stop remains so locked and provide for immediate setting of another key.

5. In a machine of the class described, the combination with operating means, column actuators, spring-upheld keys, and detent means therefor; of actuator stops on the keys spring-connected therewith, spring-held lock-strips below the stops having undercut notches, a reciprocatory blade common to the strips for retracting the same to bring their notches into registry with the stops, means actuated by the operating means upon initial movement thereof for causing said blade to so act upon the strips, with tripping provisions for freeing the same whereby to effect immediate locking down of stops, and means for thereupon tripping the key detent means to release any depressed keys and provide for key-resetting while the stops remain so locked.

6. In a machine of the class described, the combination with operating means, column actuators, spring-upheld keys, and detent means therefor; of actuator stops on the keys spring-connected therewith, spring-held lock-strips below the stops having under-cut notches, an oscillatory blade common to the strips for retracting the same to bring their notches into registry with the stops, said blade having a crank arm, a spring-retracted lever, a push-pawl pivoted thereto and engaged with said crank arm, said lever being engaged by a reciprocating member of the operating means and there being provisions for disengaging the push-pawl from the crank arm during the lever-actuating stroke of said member whereby to effect release of the strips and interlocking of notches thereof with actuator-stops; and means for tripping the key-detent means.

7. In a machine of the class described, the combination with operating means, a reciprocating actuator bar having stop-projections alternating on opposite sides thereof, and a row of superposed depressible spring-upheld keys and key stems; of stop pieces slidably mounted upon the lower ends of the key stems and having depending fingers alternating in planes of the stop projections of the actuator bar, said stop pieces also having lateral shoulders, push-and-pull springs connecting the stop-pieces and the key stems; a lock-strip extending below the stop-pieces and having a series of undercut notches; detent means to engage and hold down any depressed key with the lateral shoulder of its stop piece pressed by the push-and-pull spring upon the lock-strip adjacent the mouth of a notch thereof; means for reciprocating the lock strip by the operating means upon initial movement thereof to first move said mouth under said lateral shoulder and then engage the undercut part of the notch with the latter; and means for thereupon tripping the detent means.

8. In a machine of the class described, the combination of operating means, depressible spring-upheld amount keys, detent means for holding the same down with provisions for releasing one key by another, means for tripping the detent means by the operating means, stop-pieces, means for applying pressure to the same by the keys, means for releasing such pressure upon setting in motion the operating means and thereby causing a stop to take up effective position, spring-drawn column-actuator bars having projections, to coact with the stop pieces and also zero projections and zero stops in the paths thereof, with provisions for preventing release of bars therefrom in orders where no keys are down, when the detent means are tripped by the operating means.

9. In a machine of the class described, the combination of operating means, depressible spring-upheld amount keys, detent means for holding the same down with provisions for releasing one key by another, means for tripping the detent means by the operating means, stop-pieces, means for applying pressure to the same by the keys, means for releasing such pressure upon setting in motion the operating means and thereby causing a stop piece to take up effective position, spring-drawn column-actuator bars having projections to coact with the stop pieces and also zero projections, and zero stops in the paths thereof and yieldingly connected with the key-detent means, whereby displacement of detent means in orders where no keys are down may take place without accompanying displacement of zero stops the latter being held by engagement with zero projections of column actuator bars.

10. In a machine of the class described, the combination of operating means, depressible spring-upheld amount keys, detent means for holding the same down with provisions for releasing one key by another, means for tripping the detent means by the operating means, stop-pieces operated upon by the keys, means controlled by the operating means for setting stop-pieces of depressed keys, spring-drawn column-actuator bars having projections to coact with the stop pieces and also zero projections, zero stops in the paths thereof adapted to be withdrawn by key-depression, and totaling means adapted to withdraw said zero stops and also disable the means for setting the key-controlled stop pieces.

11. In a machine of the class described, the combination with operating means, column actuators, and keys; of stops for measuring movement of the actuators, means for applying pressure to the stops by depression of the keys, means for releasing such pressure on setting in motion the operating means and thereby causing a stop to take up effective position, means for thereupon restoring to normal the associated key while the stop remains in that position, totaling means, and means operated thereby for disabling the stop-setting means.

12. In a machine of the class described, the combination with operating means, column actuators, spring-upheld keys and detent means for holding them down, of stops for measuring movement of the actuators, means for applying pressure to the stops by depression of the keys, means for releasing such pressure on setting in motion the operating means and thereby causing a stop to take up effective position, means for thereupon tripping the detent means to release a depressed key and provide for succeeding key-setting while the stop remains in that position, totaling means, and means operated thereby for disabling the detent means and the stop-setting means.

13. In a machine of the class described, the combination with operating means, column actuators, spring-upheld keys, and detent means therefor; of actuator stops on the keys spring-connected therewith, a lock strip below the stops having undercut notches, means for reciprocating said strip upon setting in motion the operating means whereby the stop of a depressed key is caused to spring into a notch of the strip and become locked down, means for thereupon tripping the key-detent means to release the depressed key while the stop remains so locked and provide for immediate setting of another key, totaling means, and means operated thereby for disabling the lock-strip reciprocating means.

14. In a machine of the class described, the combination with operating means, column actuators, spring-upheld keys, and detent means therefor; of actuator stops on the keys spring-connected therewith, spring-held lock-strips below the stops having undercut notches, an oscillatory blade common to the strips for retracting the same to bring their notches into registry with the stops, said blade having a crank arm, a spring-retracted lever, a push-pawl pivoted thereto and engaged with said crank arm, said lever being engaged by a reciprocating member of the operating means and there being provisions for disengaging the push-pawl from the crank arm during the lever actuating stroke of said member whereby to effect release of the strips and interlocking of notches thereof with actuator-stops, totaling means, and means operated thereby for displacing the said push pawl.

15. In a machine of the class described, the combination of operating means, column actuators, spring-upheld depressible amount keys with notched stems, spring-held pivoted detent wings engaging said stems, a shiftable bar engaging the wings, a lever engaging the bar, an inclined plate slidable and spring-held on said lever, and a reciprocating member driven by the operating means and having a stud adapted under one direction of movement to operate said lever through camming coaction with the plate and on return movement to lift and pass by the same.

16. In a machine of the class described, the combination of operating means, column actuators, spring-upheld depressible amount keys with notched stems, spring-held pivoted detent wings engaging said stems, a shiftable bar engaging the wings, a lever engaging the bar, an inclined plate slidable and spring-held on said lever, a reciprocating member driven by the operating means and having a stud adapted under one direction of movement to operate said lever through camming co-action with the plate and on return movement to lift and pass by the same, and a special key and connections for displacing the plate to remove it from the path of the stud.

17. In a machine of the class described, the combination of operating means, column actuators, spring-upheld depressible amount keys with notched stems, spring-held pivoted detent wings engaging said stems, a shiftable bar engaging the wings, a lever engaging the bar, an inclined plate slidable and spring-held on said lever, a reciprocating member driven by the operating means and having a stud adapted under one direction of movement to operate said lever through camming coaction with the plate and on return movement to lift and pass by the same, and totaling means adapted to operate the lever independently of the stud.

CHARLES WALES.